United States Patent [19]

Müller

[11] Patent Number: 5,621,566
[45] Date of Patent: Apr. 15, 1997

[54] TELESCOPE AND A TELESCOPE HOLDER

[75] Inventor: Günter Müller, München, Germany

[73] Assignee: Carl•Zeiss-Stiftung, Heidenheim, Germany

[21] Appl. No.: 497,762

[22] Filed: Jul. 3, 1995

Related U.S. Application Data

[63] Continuation of Ser. No. 168,611, Dec. 16, 1993, abandoned.

[30] Foreign Application Priority Data

Dec. 23, 1992 [DE] Germany ............................ 42 43 850.0

[51] Int. Cl.⁶ .............................. G02B 23/00; G02B 7/02
[52] U.S. Cl. ........................ 359/399; 359/803; 359/810; 359/815; 359/818
[58] Field of Search ...................... 359/399, 400, 359/801, 802, 803, 804, 808, 809, 810, 815, 816, 818

[56] References Cited

U.S. PATENT DOCUMENTS

| D. 206,684 | 1/1967 | Bevilacqua | 359/815 |
|---|---|---|---|
| 672,179 | 4/1901 | Porter | 359/815 |
| 1,025,057 | 4/1912 | Hampson | 359/815 |
| 3,955,884 | 5/1976 | Del Pesco, Sr. | 359/818 |
| 4,133,603 | 1/1979 | Inouye | 359/815 |
| 4,636,047 | 1/1987 | Green | 359/879 |
| 4,946,257 | 8/1990 | Feinbloom et al. | 359/812 |
| 5,166,823 | 11/1992 | Feinbloom et al. | 359/812 |

FOREIGN PATENT DOCUMENTS

| 59-087419 | 5/1984 | Japan | G02B 2/16 |
|---|---|---|---|
| A313393 | 5/1956 | Switzerland . | |
| A682290 | 8/1993 | Switzerland | A44C 5/00 |
| 2226661 | 7/1990 | United Kingdom | G04B 47/00 |
| WO8905990 | 6/1909 | WIPO | G02B 21/00 |

Primary Examiner—Ricky D. Shafer

[57] ABSTRACT

The invention relates to a telescope mounting for a telescope. The telescope mounting is attached on an arm-band. The arm-band could include a watch. The telescope mounting ensures a stable support for the telescope. The length of the telescope should not be longer than 15 cm, preferably 6–7 cm so that the telescope will not be a burden on the arm of the telescope wearer. The diameter of the telescope is no larger than 1.5 cm. The telescope and telescope mounting could be releasable from the arm-band. A slip-on lens could be attached at the front of the telescope.

12 Claims, 2 Drawing Sheets

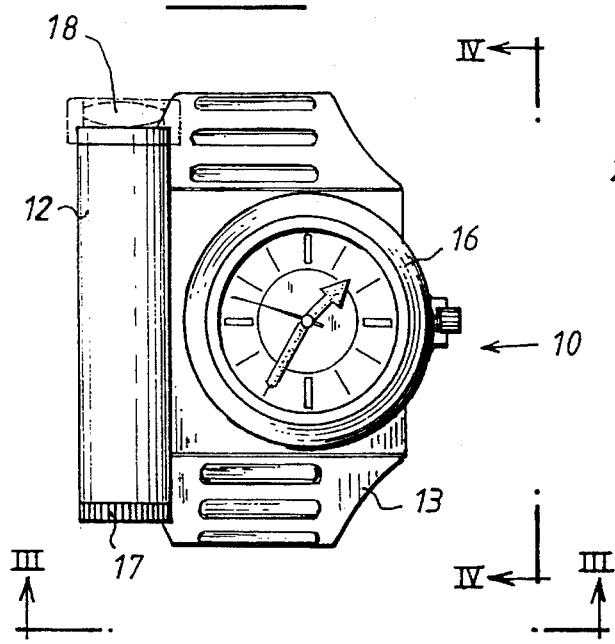
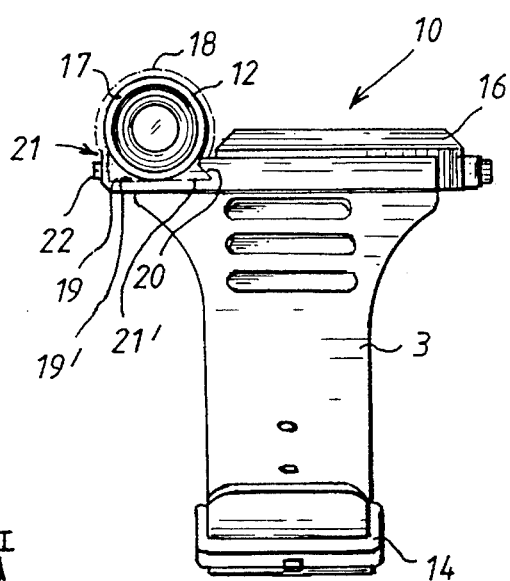
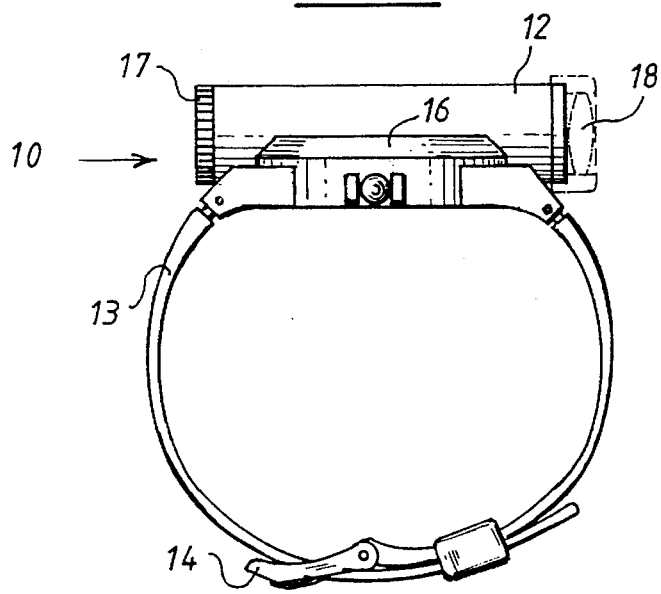

TELESCOPE AND A TELESCOPE HOLDER

This application is a continuation, of application Ser. No. 08/168,611, filed Dec. 16, 1993, now abandoned.

BACKGROUND OF THE INVENTION

This invention relates to a combination of a telescope and a telescope holder.

Telescopes and telescope holders have been known for a very long time. The best known and most widely used is a strap for binoculars, that allow the binoculars to be hung around the neck.

Telescope holders are also known that hold a telescope to the user's head or spectacles or allow the telescope to dangle on the arm.

Straps for telescopes have the disadvantage that on rapid movement, the telescope can move uncontrollably and be damaged. Such telescopes are therefore usually carried in a storage container.

Attaching the telescope to the user's head has the disadvantage that quite a bulky head frame is required. Attaching the telescope to the user's spectacles has the disadvantage that the telescope is relatively heavy and loads the bridge of the user's nose.

SUMMARY OF THE INVENTION

The object of the invention is to provide a telescope and a telescope holder that is comfortable to wear and allow the telescope to be immediately ready for use.

This object is achieved according to the invention by the combination of a telescope mounting that provides a positionally stable support for the telescope, and an arm-band to which the telescope mounting is attached, the telescope having a length no larger than 15 cm.

By attaching the telescope to an arm-band, the telescope can be carried comfortably and is immediately ready for use. In this regard, it is important that the telescope does not exceed a certain length and that the telescope is held by the arm-band in a positionally stable manner.

It is advantageous if the telescope is monocular. Its width can thus be kept very small. The use of binoculars is indeed also possible, because today binoculars have a width of about 6–7 cm when folded up. However, to be used effectively as binoculars, the binoculars have to be unfolded.

It is also advantageous if the arm-band not only carries the telescope but also carries a watch.

When the telescope is oriented with its greatest length dimension tangential to the periphery of the arm-band, the wearer needs only to raise his or her arm to easily bring the telescope before his or her eye.

When the telescope can be released from the arm-band, the telescope can be handed to another person without the wearer having to remove the arm-band.

On the other hand, a fixed connection between the telescope and the arm-band has the advantage that the telescope cannot be lost so easily.

If the diameter of the telescope is less than 1.5 cm, the telescope is not a burden on the wearer's arm. This is also aided if the telescope is no larger than 6 to 7 cm in length.

The carrying device or carrying unit according to the invention also has the advantage that the telescope can be hidden beneath a sleeve of a jacket, coat or blouse, "out of sight and protected." For quick use, the wearer need only stretch out his or her arm, and the telescope is immediately ready. The arrangement according to the invention has manifold uses: for men, women and children, and for right or left handed persons.

The arm-band should be at least 1 cm wide, so that the weight of the telescope is not particularly noticeable.

The arm-band can be elastic so that the wearer can quickly secure or remove the telescope from his or her arm.

A closure on the arm-band, allows the arm-band to be somewhat inelastic or very inelastic.

If a slip-on lens is slipped onto the telescope, according to the known art, it can be used as a magnifying glass.

If the telescope is removable, a finger ring can advantageously be attached to it. Using the ring, the telescope user, when seated, can then bring the ring towards his or her eye and the telescope into a more comfortable position for longer observations.

BRIEF DESCRIPTION OF THE DRAWINGS

The invention will now be described in further detail by means of a preferred embodiment, with reference to the drawings in which:

FIG. 2 shows a plan view of the device;

FIG. 3 shows a side view of the device seen along line III—III in FIG. 2; and

FIG. 4 shows a side view of the device, turned through 90°, seen along line IV—IV in FIG. 2

DETAILED DESCRIPTION OF A PREFERRED EMBODIMENT

Figure 1A:
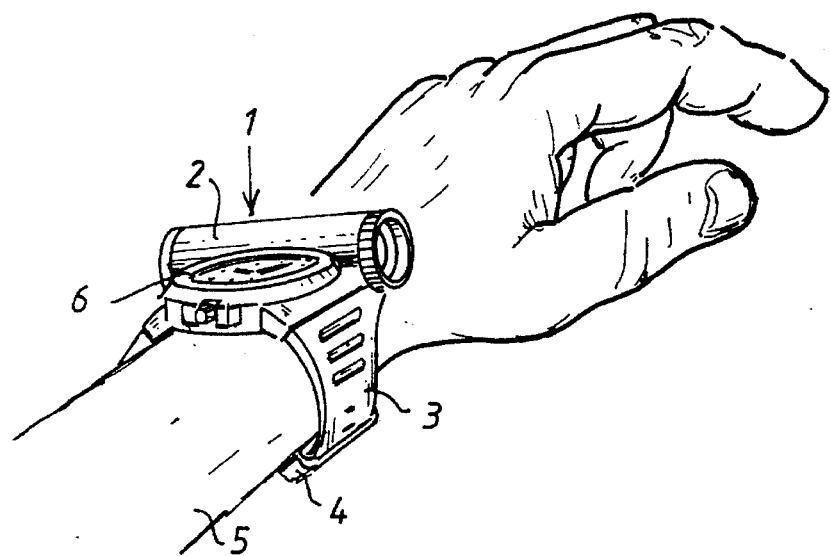
FIG. 1a shows a perspective view of the device according to the invention on a hand.

The device (1) shown in FIG. 1a consists of a telescope (2) and a telescope mounting (3) that is constructed as an arm-band or wrist strap. On the arm-band or wrist strap (3) there is a closure (4) that can be opened, as is usual for a wristwatch strap.

The device (1) is normally worn on the left hand (5). To the left from the telescope (2) is a normal wristwatch (6), so that the telescope (2) is mounted outwards, towards the hand.

Figure 1B:
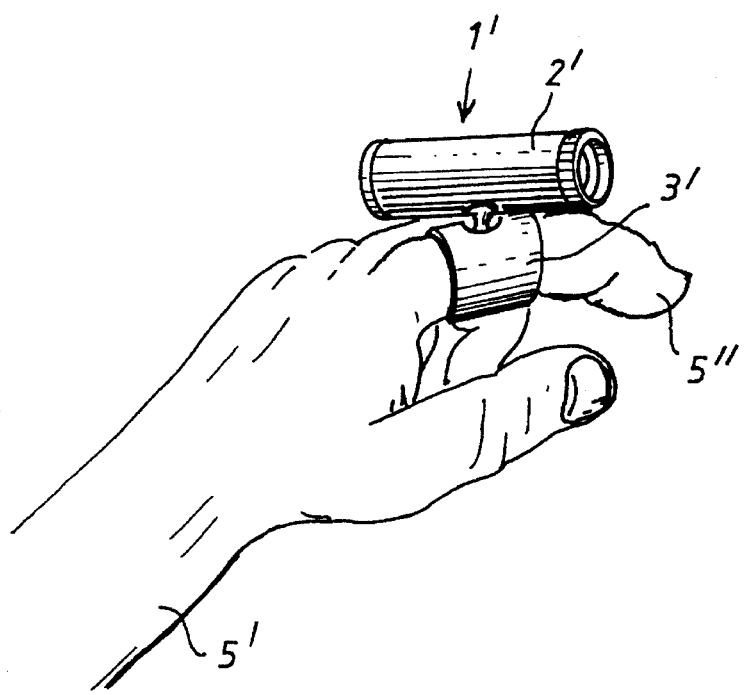
FIG. 1b shows a perspective view of the device according to the invention on a finger.

In FIG. 1b the device (1') is fixed on a mounting (3'). This mounting (3') is fixed on a finger (5") of the left hand (5'). The mounting (3') allows a quick removal of the device (1') and is at least 1 cm. wide. The material of the mounting is hard plastic, but it could be any material that is able to hold the telescope (2') in position on the finger (5"). The fixing device on the finger ring (3') for holding the telescope (2') allows a rotation of the telescope (2') of not less than 90° (alternatively, the position of the telescope (2') is fixed on the ring (3')).

The device (10) shown in FIG. 2 is different from the device shown in FIG. 1a solely in that the watch (16) is to the right of the telescope. The length of the telescope (12) is no larger than 6 cm, and the total diameter of the telescope (12) is no larger than 1.5 cm. This means that the diameter of the objective cannot be greater than 13 mm. A focusing device (17) is present on the telescope (12). The installation of the telescope (12) and the watch (16) on one arm-band or wrist strap (13) is truly dual-purpose. The device (10) is especially suitable for all types of wearers during travel by car, motorcycle, bicycle or skis, and during hiking, jogging, mountain climbing, riding, in sports, theaters and concerts, in school, and particularly in lecture halls and auditoriums.

The power of the telescope (12) is about that of a normal telescope, with a magnification between 3 and 10 times, usually about 5 times.

Because the focus is variable, the telescope, with a focus correction from 1 meter, can also be used close-up. With a slip-on lens (18), it can also be used as a magnifying glass.

The device (10) is shown in a side view in FIG. 3, in order to show that the telescope (12) projects only a little beyond the watch (16). The device can be easily fastened to or detached from the wearer's arm by means of the flexible arm-band (13) with a closure (14). This wearing device or wearing unit also has the advantage that the telescope can be concealed "out of sight and protected" e.g., beneath a sleeve of a jacket, coat or blouse. For quick use, the wearer need only extend his or her arm and the telescope is immediately ready for use. The arrangement according to the invention also has manifold uses: for men, women, children, those using their right or left eyes, and right or left handed persons.

The telescope (12) has a rectangular support body (19) with a flat plane surface (19') on its lower region, with a lateral bead (20) that engages in a corresponding recess on the upper side of the telescope mounting (21') on the arm-band (13). The bead (20) is firmly anchored in this recess, because the bead (20) is pressed into the recess from the other side by two screws (22).

The device is shown one again in FIG. 4, in a position rotated by 90° from FIG. 3.

I claim:

1. In combination, a telescope, and an arm-band having a telescope mounting body firmly attached to said arm-band, said telescope mounting body providing support for said telescope, said telescope having a holding body along its lower region, said holding body having an upper surface connecting with said telescope that is firmly attached to said telescope over nearly the entire length of said telescope, said holding body having a lower support surface over nearly the entire length of said telescope, said telescope mounting body having an upper support surface that is of nearly the same size as said lower support surface of said holding body, said lower support surface of said holding body lying non-rotatable and removable on said upper support surface of said telescope mounting body, and said telescope being oriented with its greatest dimension tangential to said arm-band along the periphery of said arm-band, so that said telescope is mounted close to and stably supported upon said arm-band.

2. Combination according to claim 1, wherein said telescope is monocular.

3. Combination according to claim 1, further comprising a watch attached to said arm-band.

4. Combination according to claim 1, wherein said telescope holding body is releasable from said arm-band, so that said telescope is separable from said arm-band.

5. Combination according to claim 1, wherein said telescope has a diameter no larger than 1.5 cm.

6. Combination according to claim 1, wherein said length of said telescope is no larger than 7 cm.

7. Combination according to claim 1, wherein said arm-band is at least 1 cm wide.

8. Combination according to claim 7, wherein said arm-band is elastic.

9. Combination according to claim 1, further comprising closure means for opening and closing said arm-band.

10. Combination according to claim 1, further comprising a slip-on lens attached at the front of said telescope for close-up observation.

11. Combination according to claim 10, wherein said slip-on lens is a magnifying glass attached at the front of said telescope.

12. A combination according to claim 1, wherein said lower support surface of said holding body is larger than the upper connecting surface of said holding body, so that the sides of said holding body are inclined, and the cross-section of said holding body is trapezoidal, and said upper support surface of said telescope mounting body has a cross-section corresponding to said lower support surface of said holding body so that said lower support surface of said holding body is attached non-shakeably to said upper support surface of said telescope mounting body.

* * * * *